(No Model.)
C. LÖPER.
EXHAUST MUFFLER.
No. 536,753.  Patented Apr. 2, 1895.
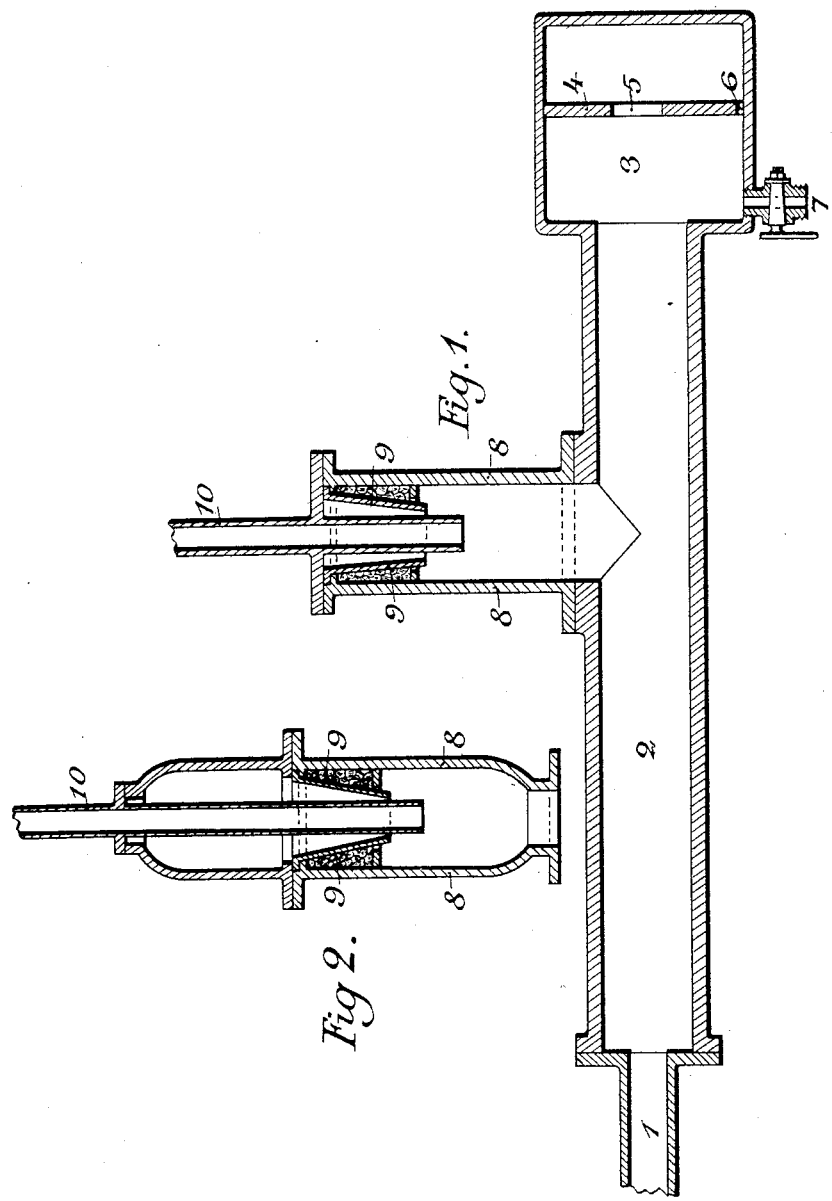
Witnesses:
O. F. Snyder
George H. Bliss.
Inventor
Carl Löper
By Attorney:
Herbert W. T. Jenner.

UNITED STATES PATENT OFFICE.

CARL LÖPER, OF LICHTENBERG, GERMANY.

EXHAUST-MUFFLER.

SPECIFICATION forming part of Letters Patent No. 536,753, dated April 2, 1895.

Application filed January 12, 1895. Serial No. 534,703. (No model.)

*To all whom it may concern:*

Be it known that I, CARL LÖPER, a subject of the King of Prussia, residing at Lichtenberg, near Berlin, Prussia, Germany, have invented certain new and useful Improvements in Exhaust-Mufflers; and I do hereby declare the following to be a full, clear, and exact description of the invention, such as will enable others skilled in the art to which it appertains to make and use the same.

This invention relates to apparatus for effecting the noiseless exhaust from steam-, gas- and other engines.

The exhaust from steam-, gas- and other engines causes a noise which in many cases has a disturbing or even troublesome effect. In order to obviate this noise reservoirs, pots or the like, and also pipes of the different widths have heretofore been employed. They have however seldom succeeded to a considerable extent and never in a perfect manner. In order to achieve this object, I use the improved apparatus represented in the accompanying drawings and hereinafter more particularly described.

Figure 1 represents a longitudinal section of this apparatus. Fig. 2 is a modification of the same.

The pipe 1 extending from the exhaust of the engine terminates in a wider tube 2 and is tightened with a soft packing. The pipe 2 has at its other end a widened part 3. This widened end is suitably provided with a bridge-piece 4 having a central aperture 5 through which the exhaust steam or gas can pass to the rear wall. The bridge-piece 4 has an aperture 6 below for the water of condensation. For letting off this water use is made of a cock 7. From the pipe 2 branches off a clay or metallic pipe 8 into which is inserted a conical sleeve 9 and is surrounded with as soft a packing as possible. The lower end of the sleeve is however preferably kept free from packing. Into the sleeve is finally inserted the discharge pipe 10 forming a tight joint.

The apparatus hereinbefore described diminishes the noise of the puffing so that it will scarcely be audible.

A modification of the pipe 8 and sleeve 9 is represented in Fig. 2, which will be understood without further explanation.

Having now particularly described and ascertained the nature of my said invention and in what manner the same is to be performed, I declare that what I claim is—

In apparatus for effecting the noiseless exhaust from steam-, gas- and other engines the combination, with the pipe 1 extending from the exhaust of the engine, of a pipe 2 having a widened end 3, and a lateral pipe 8 with a conical sleeve 9 into which the discharge pipe 10 is introduced, substantially as herein set forth.

In testimony whereof I affix my signature in presence of two witnesses.

CARL LÖPER.

Witnesses:
   JOHN B. JACKSON,
   HERR WAGNER.